United States Patent [19]

Marchand et al.

[11] Patent Number: 5,171,791
[45] Date of Patent: Dec. 15, 1992

[54] ANIONIC POLYMERIZATION PROCESS

[75] Inventors: Gary R. Marchand; Brian W. Walther; Warren R. Rose, all of Baton Rouge, La.

[73] Assignee: The Dow Chemical Company, Midland, Mich.

[21] Appl. No.: 520,159

[22] Filed: May 9, 1990

Related U.S. Application Data

[63] Continuation of Ser. No. 322,443, Mar. 13, 1989, abandoned.

[51] Int. Cl.$^5$ .............. C08F 297/04; C08F 8/36; C08F 8/40
[52] U.S. Cl. .............. 525/314; 525/271; 525/331.9; 525/333.5; 525/340; 525/344; 525/353; 525/354; 528/487; 528/490; 528/495; 528/499; 524/575
[58] Field of Search .............. 525/271, 314, 331.9, 525/333.5, 344, 340, 353, 354; 528/487, 490, 495, 499; 524/575

[56] References Cited

U.S. PATENT DOCUMENTS

| | | | |
|---|---|---|---|
| 2,712,561 | 7/1955 | Gleason | 528/487 |
| 3,288,872 | 11/1966 | House | 526/179 |
| 3,317,918 | 5/1967 | Foster | 526/173 |
| 4,038,346 | 7/1977 | Feeney | 525/271 |
| 4,415,695 | 11/1983 | Sarkar | 525/250 |
| 4,631,313 | 12/1986 | Tung et al. | 525/314 |
| 4,699,938 | 10/1987 | Minamizaki | 525/314 |
| 4,780,367 | 10/1988 | Lau | 525/314 |
| 4,992,529 | 2/1991 | Hoxmeier | 528/490 |

FOREIGN PATENT DOCUMENTS 1-056713 3/1989 Japan.

OTHER PUBLICATIONS

Translation of Japan 64–56713 (Mar. 1989).
Kamienski, C. W. "Lithium Catalysis in Industrial Polymerization", Industrial and Engineering Chemistry, vol. 57, No. 1 (Jan., 1965), pp. 38–55.

Primary Examiner—James J. Seidleck
Assistant Examiner—Vasu S. Jagannathan

[57] ABSTRACT

A process for anionic polymerization of polymerizable monomers with an organo lithium initiator followed by polymerization termination characterized in that terminated reaction products are neutralized by contacting with sulfuric acid, phosphoric acid or a mixture thereof.

2 Claims, No Drawings

ANIONIC POLYMERIZATION PROCESS

CROSS-REFERENCE TO RELATED APPLICATION

This is a continuation of application Ser. No. 322,443 filed Mar. 13, 1989, abandoned.

BACKGROUND OF THE INVENTION

The present invention relates to a process for preparing polymers by means of anionic polymerization. More particularly the present invention relates to a new method for the termination of such anionic polymerization reactions or for treating coupled reaction products of such polymerization reactions.

It is previously known in the art to prepare polymers of anionically polymerizable monomers, especially monovinylidene aromatic monomers and alkadiene monomers via anionic polymerization. Highly useful polymers are prepared in the form of block copolymers containing one or more blocks of a monovinylidene aromatic polymer and one or more blocks of an alkadiene polymer. Suitably such polymers are prepared in an organic solvent and are usefully employed in adhesive formulations, as modifiers for thermoplastic resins and asphalt or bituminous compositions or in solvent containing cements or mastic formulations. The polymers containing residual unsaturation may be hydrogenated if desired to produce products having improved weathering resistance.

The initiators used in such anionic polymerizations are typically very strong bases. Examples are the alkali metal organyl compounds, particularly alkali metal alkyls, especially sodium and lithium alkyls. After polymerization is complete, the terminal monomer group of the living polymer anion must be terminated. Termination may occur through a coupling reaction by means of a coupling agent or in the event a coupled compound is not desired by the use of suitable proton donating agents such as an organic alcohol, ammonia, amines or even water to terminate the living anion. However, the remnant formed by this termination is itself a basic species. In the industrial preparation of polymers via anionic polymerization, especially the preparation of block copolymers of monovinylidene aromatic monomers and alkadienes it is often desirable to include an antioxidant in the polymeric syrup to prevent oxidative and mechanical degradation of the polymer during devolatilization and finishing. However, many of the suitable antioxidants employed in such formulations are sensitive under basic conditions. That is, such antioxidants react with basic species thereby forming undesirable products. Alternatively under basic conditions the antioxidant may be inhibited in its ability to prevent oxidative degradation of the resulting polymer.

Consequently products which have been neutralized by the use of organic alcohols, especially such products further containing an antioxidant, have been found to be lacking in both color retention and in aging stability. Such polymeric products have been found to change in melt viscosity after further mechanical and thermal treatment and to be marked by an absence of clarity as a result of increased haze. In addition such polymeric products tend to have increased yellowing. Also, physical properties, such as ultimate tensile strength, are adversely affected.

In U.S. Pat No. 4,415,695 it is proposed to employ boric acid as a terminating agent in an anionic polymerization. Disadvantageously when boric acid is employed as a terminating agent in the preparation of a block copolymer of a monovinylidene aromatic monomer and an alkadiene, the resulting product still possesses an undesirable change in melt viscosity upon thermal aging.

It would be desirable if there were provided an improved process for preparing polymers by means of anionic polymerization techniques employing a terminating agent which does not adversely affect the polymer properties.

It would also be desirable if there were provided an improved technique for treating terminated reaction products prepared by anionic polymerization that allows for the preparation of polymers having improved clarity and other polymer properties.

It would be desirable if there were provided an improved technique for treating coupled reaction products prepared by anionic polymerization that allows for the preparation of polymers having improved clarity and other polymer properties.

Finally, it would be desirable if there were provided adhesives containing as one component the improved block copolymers of monovinylidene aromatic monomers and alkadienes prepared according to the present invention.

SUMMARY OF THE INVENTION

According to the present invention there is now provided a process for preparing polymers by means of the anionic polymerization of polymerizable monomers the steps of the process comprising:

(a) contacting one or more anionically polymerizable monomers with an alkali metal containing anionic initiator under anionic polymerization conditions;

(b) terminating the polymerization by contacting the reaction mixture resulting from step (a) with an inorganic acid selected from the group consisting of sulfuric acid, phosphoric acid, and mixtures thereof: and (c) recovering the resulting polymer.

In a further embodiment of the present invention there is provided a process for preparing polymers by means of the anionic polymerization of polymerizable monomers the steps of the process comprising:

(a) contacting one or more anionically polymerizable monomers with an alkali metal containing anionic initiator under anionic polymerization conditions;

(b) terminating the polymerization by contacting the reaction mixture resulting from step (a) with a proton donating terminating agent thereby resulting in the formation of an alkali metal salt of the proton donating terminating agent:

(c) neutralizing the alkali metal salt by contacting the reaction mixture resulting from step (b) with an inorganic acid selected from the group consisting of sulfuric acid, phosphoric acid, and mixtures thereof; and (d) recovering the resulting polymer.

In an additional embodiment of the present invention there is provided a process for preparing polymers by means of the anionic polymerization of polymerizable monomers the steps of the process comprising:

(a) contacting one or more anionically polymerizable monomers with an alkali metal containing anionic initiator under anionic polymerization conditions:

(b) coupling the reaction product of step (a) with a coupling agent thereby resulting in the formation of a coupled polymeric reaction product;

(c) contacting the reaction mixture of step (b) with an inorganic acid selected from the group consisting of sulfuric acid, phosphoric acid, and mixtures thereof; and (d) recovering the resulting polymer.

Also included within the scope of the present invention is a polymeric product prepared by anionic polymerization according to the foregoing techniques as well as formulated products such as adhesives prepared therefrom. In a particular embodiment such a polymerization product also contains residual quantities of an alkali metal compound which is the remnant of the polymerization initiator and an amount of an inorganic acid selected from the group consisting of sulfuric acid, phosphoric acid, and mixtures thereof sufficient to neutralize the alkali metal compound.

DETAILED DESCRIPTION

Processes for the anionic polymerization of monomers are well known in the art. Initial work utilizing sodium initiators such as sodium naphthalene (J. Amer. Chem. Soc., 78, 2656, 1956) was later followed by lithium containing initiators such as secondary butyllithium (U.S. Pat. Nos. 3,321,635 and 3,265,765). More recent process improvements have led to precise control of the polymerization to produce polymers having a wide variety of physical properties. Examples include EP 210,677 which discloses an adiabatic polymerization of styrene in cyclohexane followed by addition of butadiene monomer. Additional anionic techniques include hybrid Ziegler-Natta/anionic methods disclosed in U.S. Pat. No. 4,480,075; the use of Lewis bases to control diene vinyl content (U.S. Pat. No. 4,530,985); and various hydrogenation techniques to provide saturated polymeric products (U.S. Pat. Nos. 4,595,749, 4,035,445). The teachings of all of the foregoing references are incorporated herein in their entirety by reference thereto.

In addition to monofunctional initiators such as the aforementioned lithium alkyls there have been proposed certain difunctional lithium-containing initiators suitable for the use in the direct preparation of block copolymers of dienes and monovinylidene aromatic monomers. Such difunctional initiators are disclosed in U.S. Pat. Nos. 3,660,536; 3,776,893; 3,954,894; 4,172,190; 4,196,153; 4,200,718; 4,205,016; 4,431,777; 4,427,837; and 4,614,768, the teachings of these references are also incorporated by reference thereto. Preferred difunctional initiators are 1,3-phenylene-bis(3-methyl-1-phenyl pentylidene)bis-lithium, the isomeric methylphenyl substituted derivatives such as 1,3-phenylene-bis(3-methyl-1-(2-methylphenyl)pentylidene, 1,3-phenylene bis(3-methyl-1-(4-methylphenyl)pentylidene, etc. and mixtures thereof.

Suitable monomers are those in the class of anionically polymerizable monomers such as alkadienes, monovinylidenes, alkyl acrylates, acrylamides, acrylonitrile, vinylsilanes, arylsilanes, vinylketones, vinylpyridines, isocyanates, diisocyanates, oxides such as ethylene oxide, lactams and siloxanes.

Preferred polymerizable monomers for use according to the present invention include the well known alkadienes especially butadiene and isoprene, and monovinylidene aromatic monomers, especially styrene and α-methylstyrene as well as ring alkyl substituted derivatives thereof. A preferred monovinylidene aromatic monomer is styrene.

In the preferred practice of the present invention the phosphoric acid, sulfuric acid or a mixture thereof is combined with the polymer syrup resulting from the polymerization reaction. Such polymer syrup generally comprises the living anion polymer and a hydrocarbon solvent such as toluene, ethylbenzene, hexane, cyclohexane, or other suitable solvent and other additives such as antioxidants, etc. Despite the fact that the organic phase would generally be predicted to be unaffected by the addition of an inorganic acid due to partitioning of the respective components into opposite phases of the mixture it has been surprisingly discovered that effective neutralization of the polymer anion results according to the present invention.

The amount of neutralizing acid added according to the present invention should be sufficient to neutralize the polymer anion contained in the reaction mixture. Suitably the equivalent ratio of neutralizing agent added to the reaction mixture based on initial initiator added (i.e. the ratio of equivalents agent/equivalents initiator) is from 0.01:1 to 10.0:1, preferably from 0.75:1 to 2.00:1. After about 10.0, preferably from 0.75 to about 2.00. After addition of the neutralizing agent, antioxidant package and additional optional ingredients, the solvent is removed by devolatilization or other suitable technique and the resulting polymer recovered.

In the further embodiment of the present invention wherein the remnant initiator is first terminated according to conventional techniques utilizing a proton donating terminating agent and the resulting basic species then neutralized, the addition of acid may take place concurrently with the termination process or at a later time. While it may be possible to obtain thorough incorporation of the phosphoric acid or sulfuric acid if the process is accomplished at the time of termination, acceptable results are obtained if the polymer product is blended with the neutralizing agent at a later time. Suitably the blending step may be accomplished by use of a ribbon blender, extruder, or other suitable malaxing device. Amounts of neutralizing additive incorporated into the polymer generally are less than 1.0 percent based on total polymer weight.

The present invention is also suitably employed in combination with a coupled reaction process. Suitable coupling processes are previously well known in the art. A preferred process uses an organic polyhalide coupling agent such as methylene bromide, 1,2-dibromoethane or silicon tetrachloride, etc. After completion of the coupling step the resulting product is contacted with the inorganic acid in the previously disclosed manner. In the case of halide containing coupling agents the process is believed to generate the corresponding acid halide and phosphate or sulfate salt which are apparently more compatible with the polymeric product.

As previously mentioned, antioxidants may be usefully incorporated in the present products. Suitable antioxidants include those compositions previously known and utilized in the art for antioxidant purposes. Examples include hindered phenolic, phosphite, phosphonite, or phosphate type antioxidants. Other additives such as extrusion aids, UV light stabilizers, viscosity modifiers, etc. may be incorporated as desired.

Formulated products are readily prepared from the products of the present invention as is well known in the art. For example block copolymers of monovinylidene aromatic monomers and alkadienes are usefully combined with tackifiers such as hydrogenated terpenes, low molecular weight polypiperylidenes, and other suitable compounds to form an adhesive composition.

Having described the invention the following examples are provided as further illustrative of the invention and are not to be construed as limiting.

EXAMPLES 1 AND 2

A five gallon lab reactor is charged with 12.1 kg of cyclohexane, 1.70 kg of isoprene and the solution is heated to a temperature of 45° C. Then 19 g of a 0.0282 M/l cyclohexane solution of 1,3-phenylene-bis(3-methyl-1-phenylpentylidene)bis-lithium is added to the reaction solution to remove impurities. Next 380.6 g of the same 0.0282 M/l cyclohexane solution of the bis-lithium compound is added to initiate polymerization. After all the isoprene is polymerized and the reaction mixture has cooled to 60 degrees, 276.4 g of styrene monomer are added to the reaction solution. After all the styrene monomer is polymerized, 1.84 g of neat isopropanol is added to the reaction solution. The resulting polymer syrup, containing a styrene-isoprene-styrene triblock copolymer, is then separated into portions for use in the neutralization and stabilization experiments. Three approximately 1 liter portions of the above polymer syrup are weighed. The resulting polymer syrup is calculated to contain $2.01 \times 10^{-6}$ moles Li/g solution.

The amount of neutralizing agent used is calculated by assuming one mole basic species/mole Li. Phosphoric acid is treated as a one proton donor. Sulfuric acid is treated as a two proton donor. The acid concentrations are obtained from calculations based on reported acid purities, densities, and molecular weights. 0.3 Weight percent of 2,2-bis[[3-[3,5-bis(1,1-dimethyl-ethyl)-4-hydroxyphenyl]-1 -oxopropoxy]methyl]-1,3-propanediyl 3,5-bis(1,1-dimethyl-ethyl)-4-hydroxybenzene propanoate (Irganox ® 1010), and 0.3 weight percent of trisnonylphenyl phosphate stabilizer are then added.

Devolatilization

The neutralized and stabilized polymer syrups are devolatilized at 90° C. and at 8–25 psi vacuum for 2.5 hr. The polymers are cooled under about 30 psi vacuum for at least 1 hr.

Melt Viscosity Determinations

Melt viscosity determinations are made using a conventional melt indexer. The melt index determinations are made at 200° C. with a 5 kg weight and a 2.1 mm × 8 mm die (ASTM-D1238, condition 200/5.0). The results are shown in Table I.

Ultimate Tensile Measurements

Strips of polymer cut from the devolatilized slab are compression molded and tensile specimens are die cut. The compression molding conditions are for 7.0 g sample in a 3"×4.5"×0.035" chase. The press temperature is 200° C. Samples are pre-heated for 3.0 minutes under approximately 2000 kg/cm² pressure. The samples are then cured for 3 minutes at 18000 kg/cm² pressure and then cooled to ambient temperature from 200° C. at a rate of 30°–50° C./min. The sample plaques are then die cut using a NAEF ® stamping press with an ASTM D 1822, type L die. Ultimate tensile strengths are measured on a Monsanto T-10 tensometer. Special elastomeric grips are required to prevent cutting of the sample by the clamping surfaces. The thickness of the sample is recorded to 0.0001" using a micrometer and is inserted into the tensometer so as to attain a gauge length of 1.0" (2.54 cm). The samples are pulled at a cross head speed of 10 in/min (25.4 cm/min) and the tensile value is obtained at break. A summary of the data is contained in Table I.

Roll Milling

Portions of the devolatilized polymer slabs are roll milled twice for 3.5 minutes at 155° C. at a gap width of 0.028" (0.28 mm).

Tests on Roll Milled Samples

Melt index and in some cases ultimate tensile determinations were performed on the roll milled polymers. Melt index and tensile determinations followed the same procedure as for the previously disclosed slab materials.

Color and Haze Tests

A portion of the plaque made from roll milled polymer was tested for yellowness index and percent haze according to ASTM D 1925-70 and ASTM D 1003-61, respectively. A Hunterlab Inc. Tristimulus ® colorimeter was used for both measurements. The instrument was standardized for diffuse transmittance. The data are located in Table I.

TABLE I

| Example | Neutralizer | Percent Change After Roll Milling | | | |
|---|---|---|---|---|---|
| | | Melt Index a | Ultimate Tensile b | Yellow Index c | Trans. Haze c |
| Comparative | none | 26 | 32 | 3.2 | 28% |
| 1 | sulfuric acid | 13 | 15 | 2.0 | 22 |
| 2 | phosphoric acid | 19.6 | 6 | 3.1 | 23 | a = (1 − (Initial MFR/Final MFR)) * 100
b = (1 − (Final Tensile/Initial Tensile)) * 100
c = Roll Milled Polymer As may be seen by reference to Table I, the use of sulfuric acid or phosphoric acid to neutralize remnants of the lithium initiator resulted in a product having improved ultimate tensile strength after exposure to further processing conditions as well as improved yellowness and haze after such processing.

EXAMPLE 3

A five gallon reactor is charged with 12.4 kg of cyclohexane, 566 g of styrene, and the solution is heated to a temperature of 45° C. Then 160 g of a 0.295 M/l cyclohexane solution of sec-butyl lithium is added to initiate polymerization. After all the styrene is polymerized and the reaction mixture has cooled to 45° C., 1455 g of Butadiene monomer is added to the reaction solution. After all the butadiene monomer is polymerized, 31 g of a 0.0584 M/l cyclohexane solution of dibromoethane is added over an eight minute period. The resulting polymer syrup, containing a styrene-butadiene-styrene triblock copolymer, is then separated into portions for use in the neutralization and stabilization experiments. Two portions of approximately 2 liters of the above polymer syrup are weighed. The polymer syrup is calculated to contain $4.19 \times 10^{-6}$ moles Li/g of solution.

The two portions are treated as follows. To one sample of polymer syrup no phosphoric acid is added. Phosphoric acid is added to the other sample in a ratio of one mole of acid to one mole of lithium. The acid concentration is obtained from a calculation based upon the reported acid purity, density, and molecular weight. 0.5

Weight percent of 2,4-bis(n-octylthio)-6-(4-hydroxy-3,5-ditertiarybutylanilino)-1,3, 5-triazine (Irganox ® 565) and 0.5 weight percent of tris(2,4-ditertiarybutylphenyl) phosphite (Irgafos ® 168) are then added. Devolatilization, melt viscosity determination, ultimate tensile measurement, and color and haze tests are performed as in Examples 1 and 2. The total time of roll milling is 20 minutes for this study. The data from these tests are located in Table II.

TABLE II

| Example | Acid Ratio to Li | Percent Change After Roll Milling | | | |
|---|---|---|---|---|---|
| | | Melt Index a | Ultimate Tensile b | Yellow Index c | Trans. Haze c |
| Comparative 3 | 0 | 20 | 15 | 16.3 | 98.0 |
| | 1.0 | 11 | 14 | 7.5 | 47.1 | a = (1 − (Initial MFR/Final )) * 100
b = (1 − (Final Tensile/Initial Tensile)) * 100
c = Roll Milled Polymer

EXAMPLE 4

A five gallon reactor is charged with 12.5 kg of cyclohexane, 285 g of styrene, and the solution is heated to a temperature of 45° C. Then 70 g of a 0.295 M/l cyclohexane solution of sec-butyl lithium is added to initiate polymerization. After all the styrene is polymerized and the reaction mixture has cooled to 45° C., 1565 g of butadiene monomer is added to the reaction solution. After all the butadiene monomer is polymerized and the reactor is cooled to 45° C., 285 g of styrene is added. After all the styrene is polymerized, about 2 ml of isopropanol is added to quench the reaction. The resulting polymer syrup, containing a styrene-butadiene-styrene triblock copolymer, is then separated into portions for use in the neutralization and stabilization experiments. Two portions of approximately 2 liters of the above polymer syrup are weighed. The polymer syrup is calculated to contain $1.82 \times 10^{-6}$ moles Li/g of solution.

The two portions are treated as follows. To one sample of polymer syrup no phosphoric acid is added. Phosphoric acid is added to the other sample in a ratio of one mole of acid to one mole of lithium. The acid concentration is obtained from a calculation based upon the reported acid purity, density, and molecular weight. 0.5 Weight percent of Irganox ® 565 and 0.5 weight percent of Irgafos ® 168 are then added. Devolatilization, melt viscosity determination, ultimate tensile measurement, and color and haze tests are performed as in Examples 1 and 2. The total time of roll milling is 20 minutes for this study. The data from these tests are located in Table III.

TABLE III

| Example | Acid Ratio to Li | Percent Change After Roll Milling | | | |
|---|---|---|---|---|---|
| | | Melt Index a | Ultimate Tensile b | Yellow Index c | Trans. Haze c |
| Comparative 4 | 0 | 39 | 41 | 3.1 | 13.3 |
| | 1.0 | 30 | 15 | 3.9 | 13.4 | a = (1 − (Initial MFR/Final )) * 100
b = (1 − (Final Tensile/Initial Tensile)) * 100
c = Roll Milled Polymer

What is claimed is:

1. An adhesive formulation comprising a polymer prepared by means of a process comprising:
   (a) contacting one or more anionically polymerizable monomers selected from the group consisting of monovinylidene aromatic monomers and alkadienes with an organolithium containing anionic initiator under anionic polymerization conditions;
   (b) terminating the polymerization by contacting the reaction mixture resulting from step (a) with a proton donating terminating agent selected from the group consisting of water and alcohols thereby resulting in the formation of a lithium salt of the proton donating terminating agent; and
   (c) neutralizing the alkali metal salt by contacting the reaction mixture resulting from step (b) with from 0.01 to 10.00 equivalents phosphoric acid per equivalent of initiator.

2. An adhesive formulation according to claim 1 additionally comprising a tackifier.

* * * * *